United States Patent [19]

Masaki

[11] Patent Number: 5,285,330
[45] Date of Patent: Feb. 8, 1994

[54] APPARATUS FOR CONTROLLING MOVING SPEED OF MAGNETIC HEAD

[75] Inventor: Hideo Masaki, Tokyo, Japan

[73] Assignee: Kabushiki Kaisha Toshiba, Kawasaki, Japan

[21] Appl. No.: 751,711

[22] Filed: Aug. 29, 1991

[30] Foreign Application Priority Data

Aug. 31, 1990 [JP] Japan .................. 2-230091
Aug. 31, 1990 [JP] Japan .................. 2-230092

[51] Int. Cl.$^5$ ............... G11B 21/08; G11B 21/02; G11B 5/596
[52] U.S. Cl. ............... 360/77.08; 360/75; 360/78.14; 360/109
[58] Field of Search .............. 360/75, 77.04, 78.06, 360/77.08, 78.07, 78.14, 109

[56] References Cited

U.S. PATENT DOCUMENTS

| | | | |
|---|---|---|---|
| 4,462,053 | 7/1984 | Lum et al. | 360/78.06 |
| 4,499,511 | 2/1985 | Sugaya | 360/77.08 |
| 4,524,398 | 6/1985 | Fujiki | 360/78.06 |
| 4,937,689 | 6/1990 | Seaver et al. | 360/78.06 |
| 4,937,803 | 6/1990 | Nakane | 360/78.06 |
| 5,021,898 | 6/1991 | Sakai et al. | 360/77.08 |
| 5,051,851 | 9/1991 | Sakurai | 360/77.08 |
| 5,126,897 | 6/1992 | Ogawa et al. | 360/78.06 |
| 5,168,398 | 12/1992 | Kanda et al. | 360/77.04 |

*Primary Examiner*—John Zazworsky
*Attorney, Agent, or Firm*—Finnegan, Henderson, Farabow, Garrett & Dunner

[57] ABSTRACT

In a magnetic disk apparatus, the integral value of position information representing the current position of a magnetic head is obtained from address code data corresponding to a cylinder number recorded on a disk. The decimal value of the position information is computed from the level values of burst data recorded on the disk. The moving speed value of the magnetic head and a remaining distance are calculated on the basis of the position information having the obtained integral and decimal values. Two target speed values are extracted from a speed table in accordance with the remaining distance, and an intermediate value between the two target speed values is approximately computed. With this operation, a more accurate target speed value corresponding to the remaining distance is obtained.

10 Claims, 12 Drawing Sheets

| REMAINING DISTANCE $X_E$ | TARGET SPEED $V_R$ |
|---|---|
| 0 | 0.00 |
| 0.25 | 0.32 |
| 0.50 | 0.45 |
| 0.75 | 0.55 |
| 1.00 | 0.63 |
| 1.25 | 0.71 |
| ⁓ | ⁓ |
| 20.00 | 2.83 |
| 20.25 | 2.85 |
| 20.50 | 2.86 |
| 20.75 | 2.88 |
| 21.00 | 2.90 |
| ⁓ | ⁓ |
| 249.00 | 9.98 |
| 249.25 | 9.98 |
| 249.50 | 9.99 |
| 249.75 | 9.99 |
| 250.00 | 10.00 |

F I G. 3

| REMAINING DISTANCE $X_E$ | TARGET SPEED $V_R$ |
|---|---|
| 0 | 0 |
| 1 | 0.63 |
| 2 | 0.89 |
| ⁓ | ⁓ |
| 20 | 2.83 |
| 21 | 2.90 |
| ⁓ | ⁓ |
| 249 | 9.98 |
| 250 | 10.00 |

F I G. 4

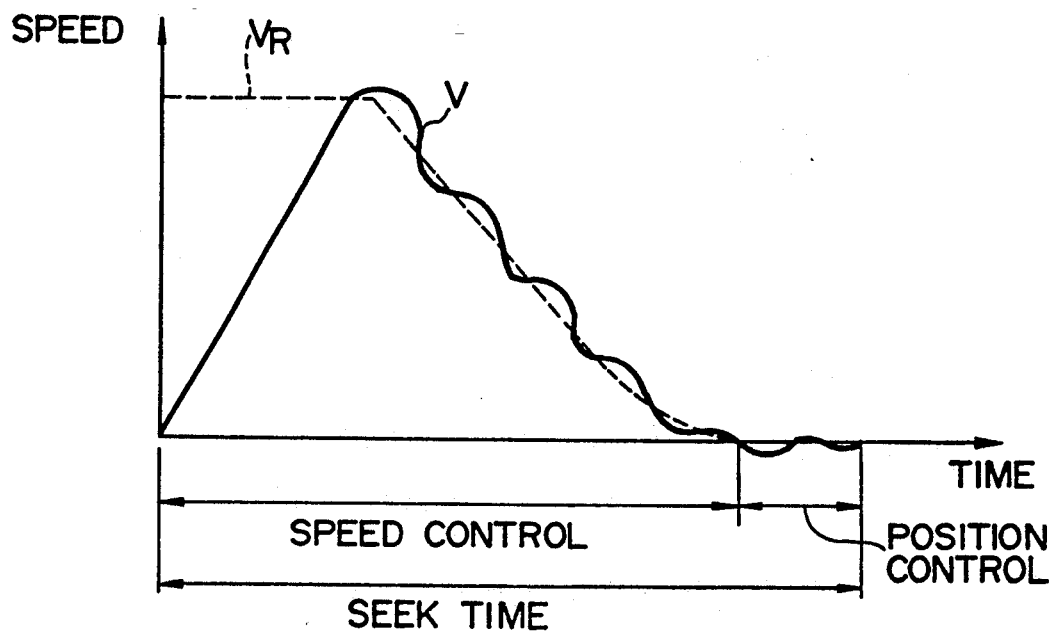
F I G. 6
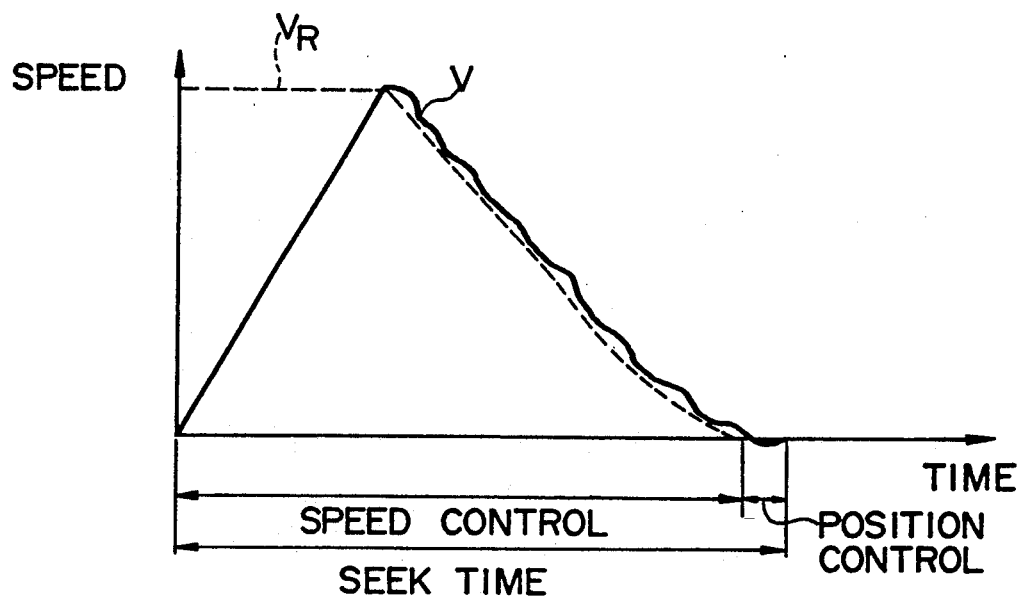
F I G. 12

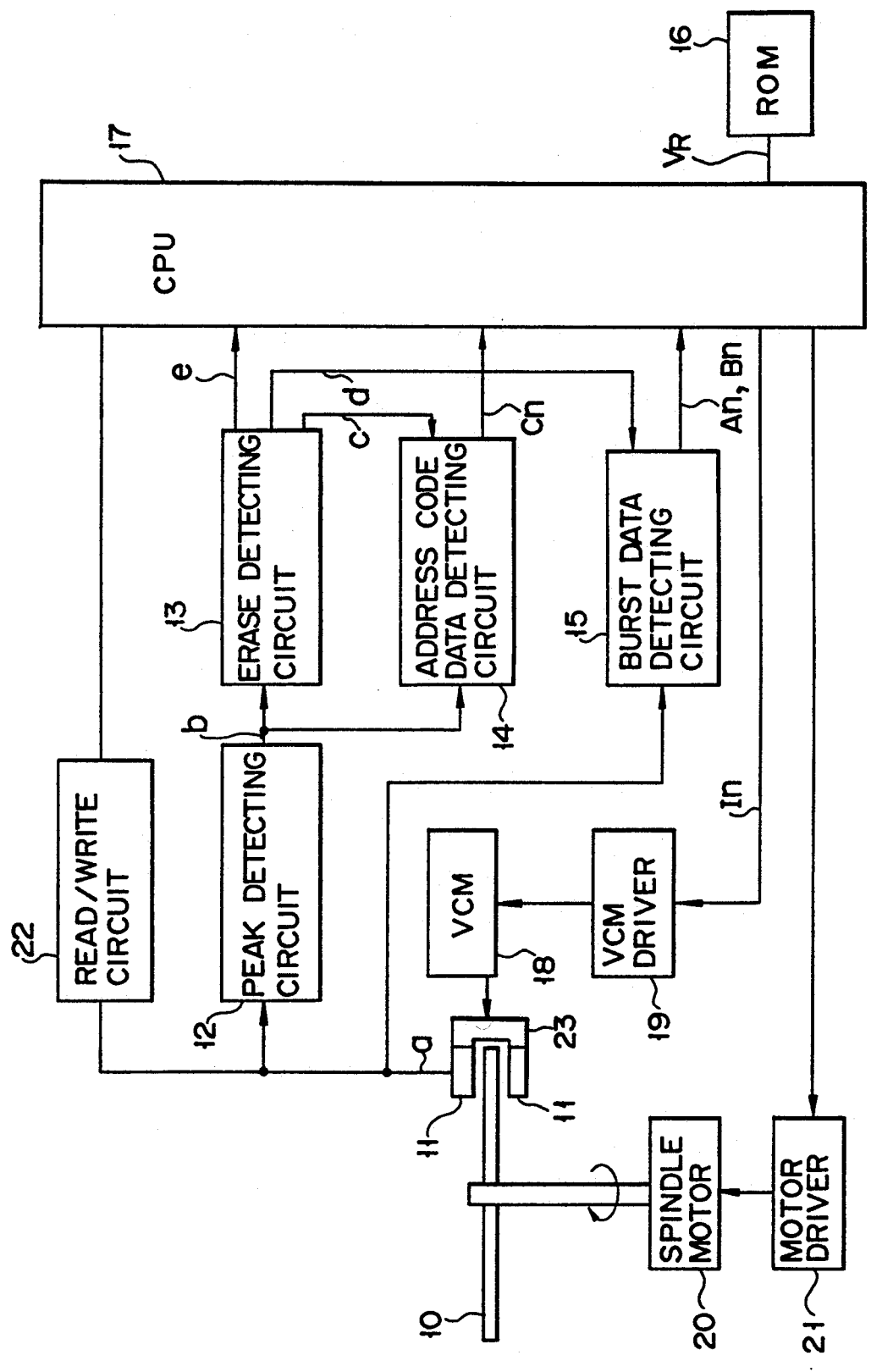
F I G. 7

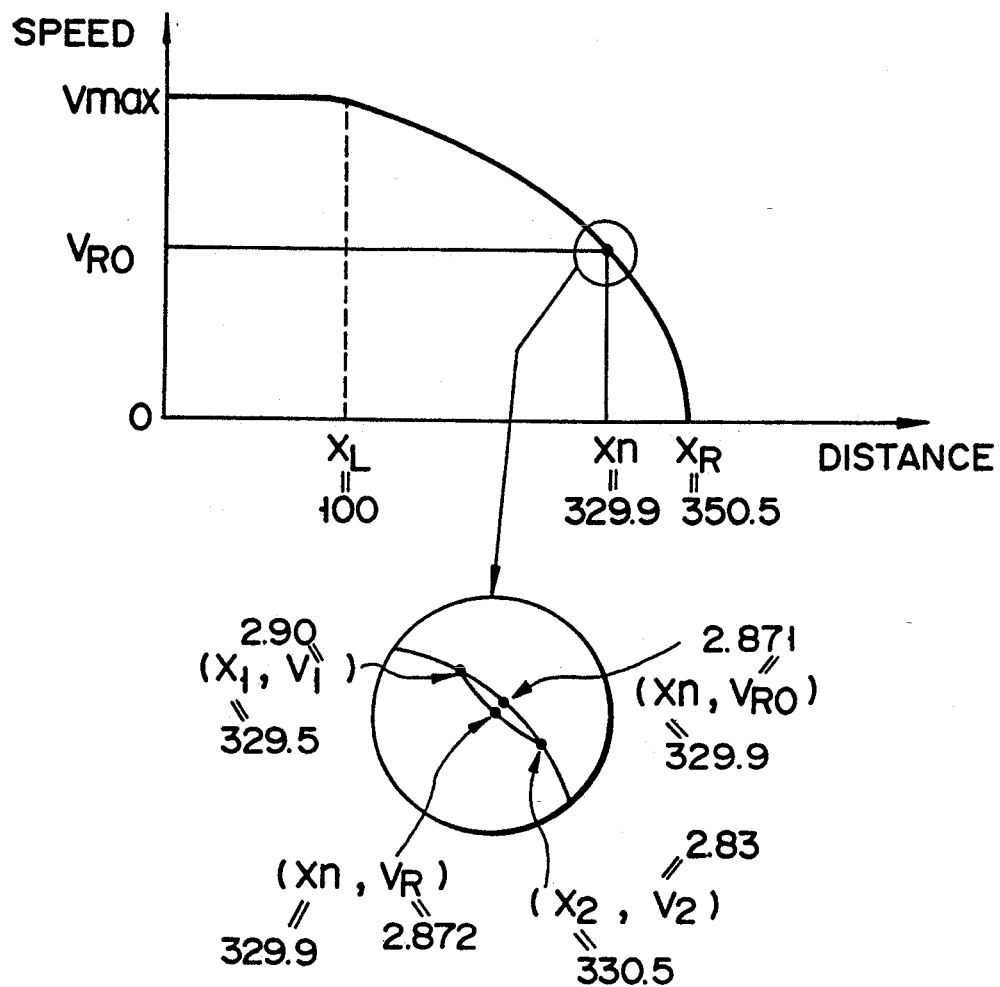
F I G. 14

APPARATUS FOR CONTROLLING MOVING SPEED OF MAGNETIC HEAD

BACKGROUND OF THE INVENTION

1. Field of the Invention

The present invention relates to an apparatus for controlling the moving speed of a magnetic head.

2. Description of the Related Art

In a conventional magnetic disk apparatus of, e.g., a sector servo type, position information is produced on the basis of servo data prerecorded on a disk as a recording medium, and positioning control of a magnetic disk is performed in accordance with the position information. This positioning control includes speed control and position control. In speed control, the actual moving speed value of the magnetic head is obtained in accordance with the produced position information, and the moving speed value of the magnetic head is adjusted such that the actual moving speed value coincides with a target speed value. That is, control is performed to position the magnetic head at a target position, i.e., a target cylinder (track). In contrast to this, in position control, when the magnetic head is moved to the target position by the speed control, the position of the magnetic head is adjusted such that the current position, of the magnetic head, which is based on the position information coincides with the target position. That is, control is performed to position the magnetic head at the center of the target cylinder.

A target speed value VR of the magnetic head is determined in accordance with a remaining distance XE from a current position Xn to a target position XR of the magnetic head. In accelerating the magnetic head, a maximum speed value Vmax is used. In decelerating the magnetic head, a speed value which changes as shown in FIG. 1 is generally used as a target speed value. Referring to FIG. 1, reference symbol V denotes the moving speed value of the magnetic head. In decelerating the magnetic head, the target speed value VR of the magnetic head corresponding to the remaining distance XE is calculated according to the following equation:

$$VR = \sqrt{S \cdot (XR - Xn)} \quad (1)$$

where S is a coefficient. However, it is difficult to perform the calculation of equation (1) by firmware. In practice, therefore, a speed table in which the target speed value VR corresponding to the remaining distance XE is preset is used to obtain a value similar to the target speed value VR calculated according to equation (1).

In this case, in order to obtain the accurate target speed value VR, a speed table having detailed position data shown in, e.g., FIG. 3, is required. That is, a speed table is required in which the remaining distances XE representing the distances between the current positions and target positions of the magnetic head are set as real numbers including zero and decimals such as 0.25, 0.50, ... In contrast to this table, in a speed table shown in FIG. 4, the remaining distances XE are set as integers representing cylinder numbers, such as 0, 1, 2, ... Therefore, by using the speed table shown in FIG. 3, a more accurate target speed VR can be obtained.

In order to use the speed table (FIG. 3) in which the remaining distances XE are set as real numbers, a large storage capacity is required as compared with the case wherein the speed table (FIG. 4) in which the remaining distances XE are set as integers is used. In addition, even if such a speed table is used, as the remaining distance XE becomes closer to 0, i.e., the current position Xn of the magnetic head becomes closer to the target position XR, an error in the target speed value VR is increased. For example, in the speed table shown in FIG. 4, if the remaining distance XE is a value between 249.75 and 250.00, the corresponding target speed value VR is 9.99 or 10.00. That is, the difference is 0.01. If, however, the remaining distance XE is a value between 0 and 0.25, the corresponding target speed value VR is 0.00 or 0.32. That is, the difference is increased to 0.32. This is because as the current position Xn of the magnetic head becomes closer to the target position XR, the speed curve of the magnetic head becomes steeper.

Furthermore, in the conventional magnetic disk apparatus having the speed table of FIG. 4, as shown in FIG. 5, as long as the magnetic head is located in the same cylinder (nth cylinder in this case), the current position of the magnetic head is indicated by the same value regardless of whether the magnetic dead is located at a position P1, P2, or P3 on the disk. Therefore, an accurate target speed value corresponding to the remaining distance cannot be obtained. As a result, as shown in FIG. 6, the moving speed value V to the target speed value VR greatly varies during deceleration of the magnetic head.

Note that a magnetic disk apparatus using a position detector such as a linear sensor is employed in order to accurately detect the current position of the magnetic head. Such a magnetic disk apparatus, however, requires a complicated arrangement, and an increase in cost is inevitable.

Since the moving speed value of the magnetic head greatly varies during deceleration of the magnetic head, the settling time is prolonged, resulting in an increase in the time required for seeking the magnetic head.

Under the circumstances, demands have arisen for a magnetic recording and reproducing apparatus which can accurately move the magnetic head to a target position at high speed.

SUMMARY OF THE INVENTION

It is an object of the present invention to provide an apparatus for controlling the moving speed of a magnetic head.

According to the present invention, there is provided a magnetic reproducing and recording apparatus comprising a recording medium on which servo information including address information and burst information is recorded, head means for obtaining the servo information recorded on the recording medium, as a reproduced signal, means for detecting the address information from the obtained reproduced signal, means for detecting the burst information from the obtained reproduced signal, storage means for storing a remaining distance between a current position and a target position of the head means and a target speed value corresponding to the remaining distance, and means for obtaining an integral value of position information representing the current position of the head means in accordance with the detected address information, obtaining a decimal value of the position information representing the current position of the head means in accordance with the detected burst information, computing the remaining distance on the basis of position information constituted by the obtained integral and decimal values, reading out a target speed value corresponding to the computed remaining distance from the storage means, and controlling movement of the head means in accordance with the read out target speed value.

In addition, according to the present invention, there is provided a magnetic reproducing and recording apparatus comprising a recording medium on which servo information is recorded, head means for obtaining the servo information recorded on the recording medium, storage means for storing a remaining distance between a current position and a target position of the head means and a target speed value corresponding to the remaining distance, means for obtaining position information representing the current position of the head means in accordance with the obtained servo information, and means for computing the remaining distance on the basis of the obtained position information, reading out first and second target speed values from the storage means on the basis of the computed remaining distance, computing an intermediate speed value from the obtained position information and the read first and second target speed values, and controlling movement of the head means in accordance with the computed intermediate speed value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Brief Description of the Drawings

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3 and 4 are views, each showing remaining distances and corresponding target speeds in a speed table;

FIG. 6 is a graph for explaining a variation of a moving speed value during deceleration of the magnetic head;

FIG. 7 is a block diagram showing an arrangement of a magnetic disk apparatus according to an embodiment of the present invention;

FIG. 12 is a graph for explaining a variation of a moving speed during deceleration of the magnetic head in the embodiment;

FIG. 14 is a graph for explaining approximation of a target speed value in the embodiment.

DETAILED DESCRIPTION OF THE PREFERRED EMBODIMENTS

Figure 1:
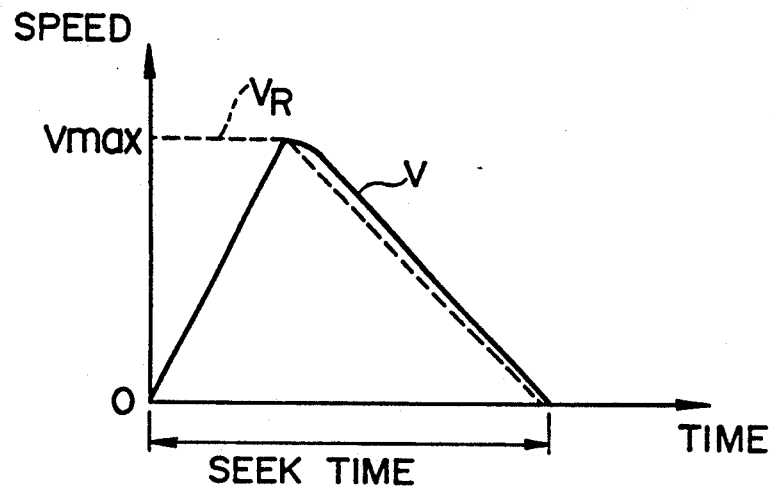
FIG. 1 is a graph showing a target speed curve representing the target speed of a magnetic head as a function of moving time during deceleration of the magnetic head.
Figure 2:
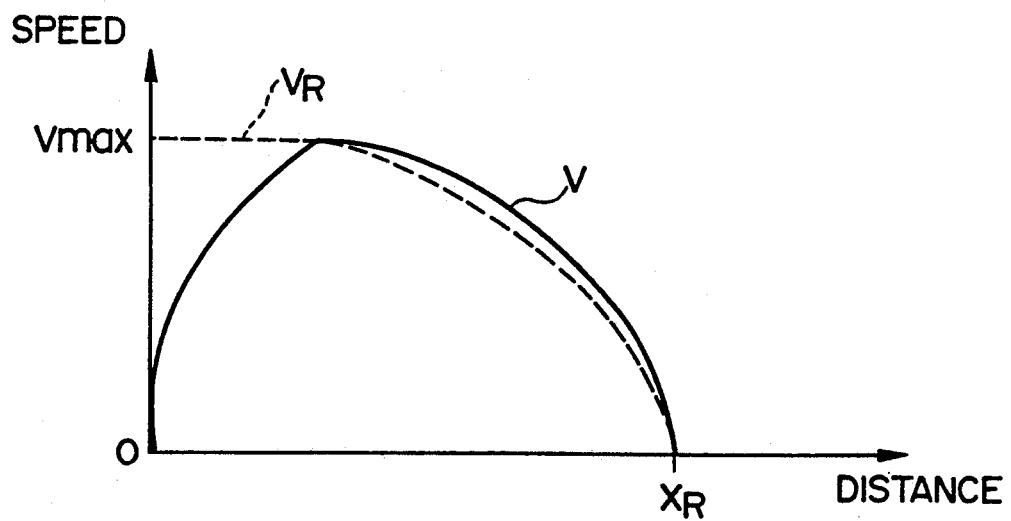
FIG. 2 is a graph showing a target speed curve representing the target speed of the magnetic head as a function of moving distance during deceleration of the magnetic head.
Figure 5:
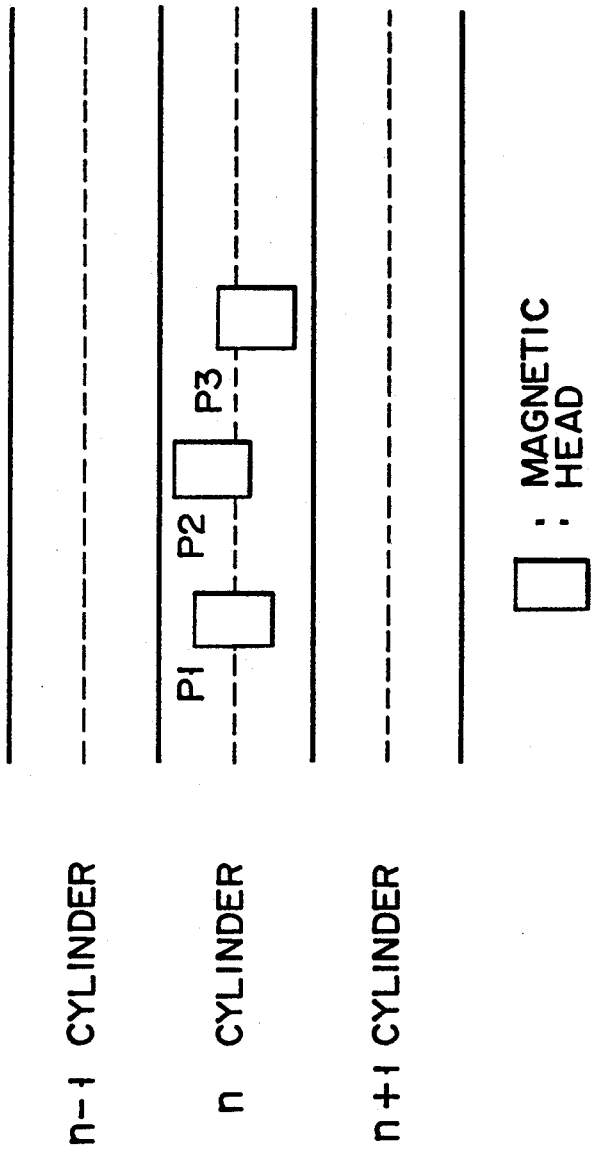
FIG. 5 is a view for explaining a positional relationship between the position of the magnetic head on a cylinder and a value representing its current position.

An embodiment of the present invention will be described below with reference to the accompanying drawings.

FIG. 7 is a block diagram showing the arrangement of a magnetic disk apparatus of a sector servo type according to an embodiment of the present invention. Referring to FIG. 7, the magnetic disk apparatus of this embodiment comprises a disk 10, a magnetic head 11, a peak detecting circuit 12, an erase detecting circuit 13, an address code data detecting circuit 14, a burst data detecting circuit 15, a ROM (read only memory) 16, a CPU (central processing unit) 17, a voice coil motor (VCM) 18, a VCM driver 19, a spindle motor 20, a motor driver 21, a read/write circuit 22, and a carriage 23.

Figure 8:
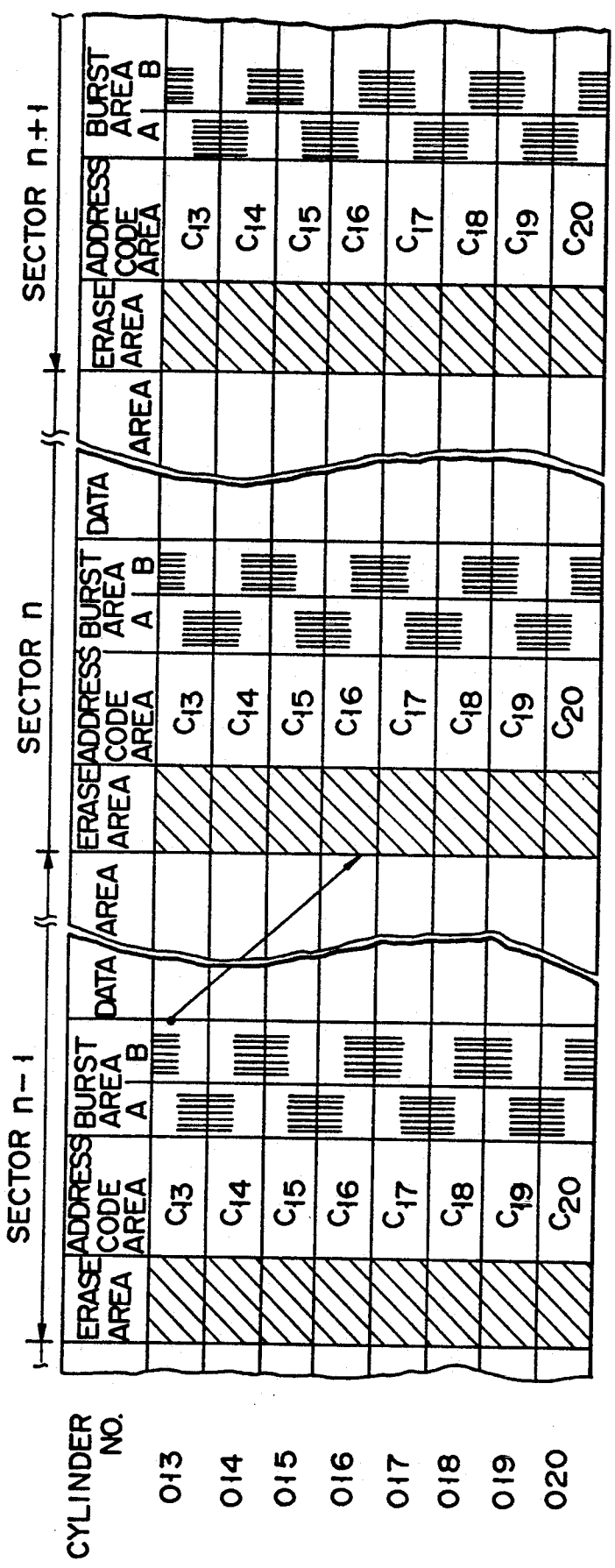
FIG. 8 is a view showing the format of a disk.

The disk 10 is used as a recording medium and has a plurality of cylinders, as shown in FIG. 8 (which only shows cylinder numbers 013 to 020). Each cylinder has a plurality of sectors. In each sector, servo data including address code data Cn and burst data A and B is recorded in advance. The address code data Cn represents a cylinder number and is used in speed control for moving the magnetic head 11 to a target cylinder. In addition, the burst data A and the burst data B are used in position control for positioning the magnetic head 11 at the center of a target cylinder and are recorded in advance to be shifted from the center of a corresponding cylinder by ½ the cylinder. In the burst data, magnetization reverse occurs at a desired frequency. In FIG. 8, a vertical line represents a magnetization reverse position.

The magnetic head 11 moves over the disk 10 to read/write data from/on the disk 10. A reproduced signal a obtained by the magnetic head 11 is input to the peak detecting circuit 12 and the burst data detecting circuit 15. Note that a data read/write operation by a user is performed between the magnetic head 11 and the CPU 17 through the read/write circuit 22.

The peak detecting circuit 12 converts the reproduced signal a obtained by the magnetic head 11 into a binary signal, and outputs the binary reproduced signal a as a read pulse signal b to the erase detecting circuit 13 and the address code data detecting circuit 14.

The erase detecting circuit 13 is used to detect an erase area indicating the start position of each sector, and checks, on the basis of the read pulse signal b from the peak detecting circuit 12, whether erase data without magnetization reverse, e.g., a "0"-level signal is continuously detected for a predetermined period of time or more. If erase data are continuously detected for the predetermined period of time or more, erase detection signals c, d, and e are respectively input to the address code data detecting circuit 14, the burst data detecting circuit 15, and the CPU 17 at predetermined timings.

The address code data detecting circuit 14 performs serial/parallel conversion of the read pulse signal b from the peak detecting circuit 12 in accordance with the erase signal c from the erase detecting circuit 13. The circuit 14 then outputs the address code data Cn of the serial/parallel-converted read pulse signal b to the CPU 17.

The burst data detecting circuit 15 samples/holds the burst data A and B of the reproduced signal a in accordance with the erase signal d from the erase detecting circuit 13, and performs A/D (analog/digital) conversion of level values An and Bn of the sampled/held burst data A and B. Signals representing the A/D converted level values An and Bn are input to the CPU 17. Note that the level values An and Bn represent the positional shift of the magnetic head 11 from the center of a cylinder, and that the level values themselves correspond to the shift amount of the magnetic head 11; and their polarities, the direction of positional shift.

The ROM 16 stores speed data representing target speed values corresponding to the remaining distances between the current positions and target positions of the magnetic head. In this embodiment, a speed table is used in which the remaining distances XE are set as integers such as 0, 1, 2, ..., and target speed values are set in correspondence with these values, as shown in FIG. 4.

The CPU 17 performs overall control of the magnetic disk apparatus of the embodiment. In the embodiment, on the basis of the address code data Cn output from the address code data detecting circuit 14 and the signals representing the level values An and Bn of the burst data A and B output from the burst data detecting circuit 15, a control signal In for driving the VCM 18 is input from the CPU 17 to the VCM driver 19. In addition, a control signal fr driving the spindle motor 20 is input from the CPU 17 to the motor driver 21.

The VCM driver 19 drives the VCM 18 in response to the control signal In from the CPU 17.

The carriage 23 supports the magnetic head 11, and is driven by the VCM 18. With this operation, the magnetic head 11 is moved over the disk 10.

The read/write circuit 22 is used to read/write data from/on a data area of the disk 10.

The motor driver 21 drives the spindle motor 20 in accordance with the control signal from the CPU 17. The disk 10 is rotated upon this driving operation.

Figure 9A:
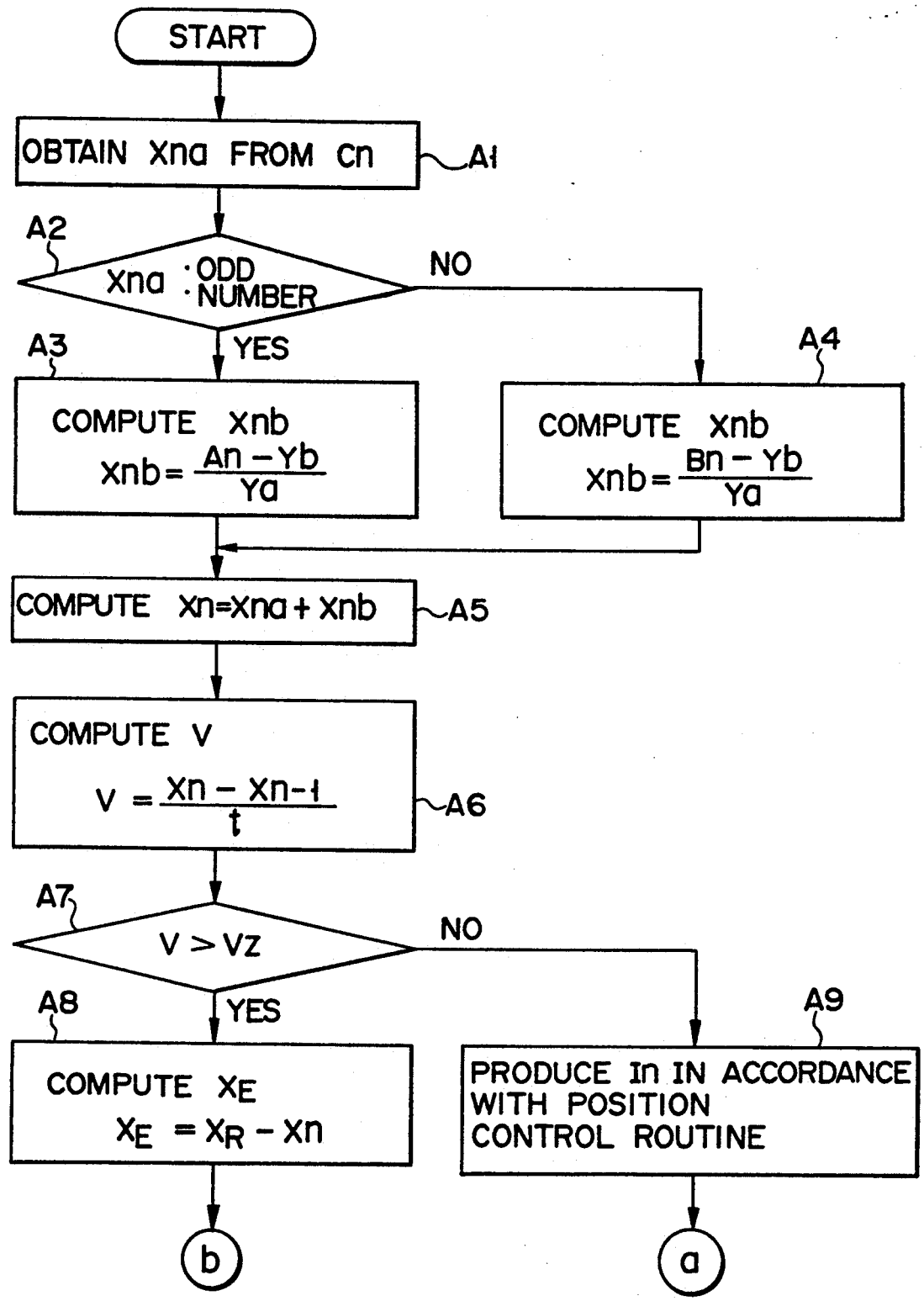
FIGS. 9A and 9B are flow charts showing a sequence for controlling the moving speed of the magnetic head, which is performed by a CPU in the magnetic disk apparatus of the embodiment.
Figure 9B:
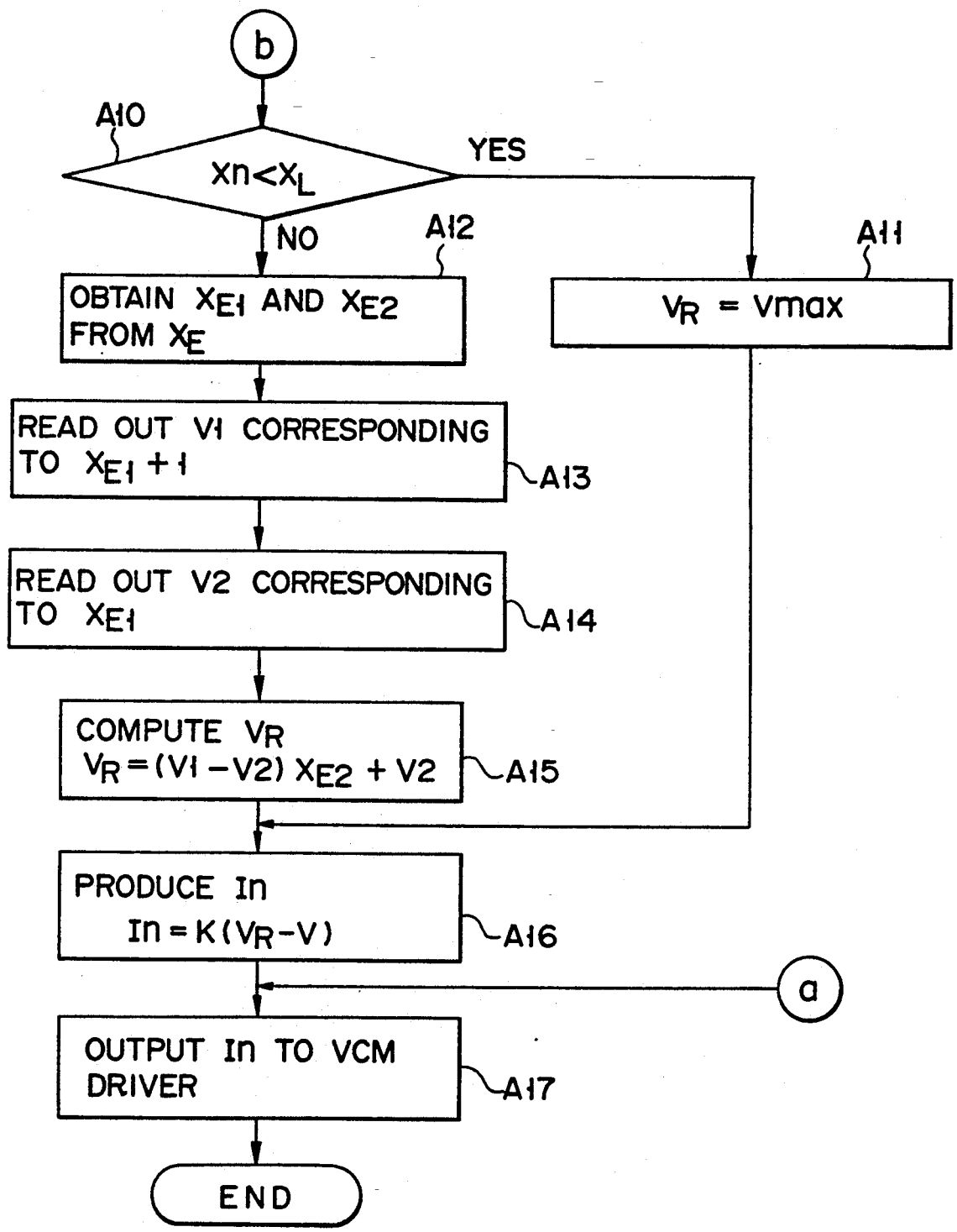

Magnetic head moving speed control performed by the CPU 17 of the magnetic disk apparatus of the embodiment will be described below with reference to the flow charts shown in FIGS. 9A and 9B.

When a target position (target cylinder) to which the magnetic head 11 is to be moved is determined, the magnetic head 11 is moved over the disk 10 toward the determined target position. While the magnetic head 11 is moved, servo data prerecorded in the disk 10 is read out every sector time by the magnetic head 11. In this case, one sector time is a value obtained by dividing the time required for one rotation of the disk 10 by the number of sectors of one cylinder. That is, one sector time corresponds to a sampling time for position information.

As described above, servo data includes address code data and burst data. The address code data Cn is obtained by the address code data detecting circuit 14, and the level values An and Bn of the burst data A and B are obtained by the burst data detecting circuit 15. The address code data Cn and signals representing the level values An and Bn are input to the CPU 17. As a result, the CPU 17 performs the following operation.

In step A1, an integral value Xna corresponding to the integral part of position information representing the current position Xn of the magnetic head 11 is obtained from the address code data Cn.

In step A2, it is checked whether the integral value Xna is an odd number. If YES in step A2, a decimal value Xnb corresponding to the decimal part of the position information representing the current position Xn of the magnetic head 11 is computed according to the following equation (step A3):

$$Xnb = (An - Yb)/Ya \quad \ldots (2)$$

If it is determined in step A2 that the integral value Xna is an even number, the decimal value Xnb is computed according to the following equation (step A4):

$$Xnb = (Bn - Yb)/Ya \quad \ldots (3)$$

Figure 10:
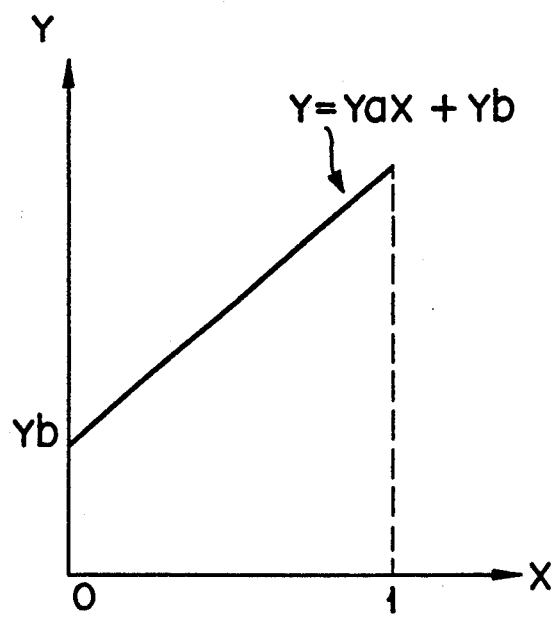
FIG. 10 is a graph for explaining changes in the level value of burst data on an arbitrary XY coordinate system.

In equations (2) and (3), Ya is the inclination of the level value of the burst data on the XY coordinate system in FIG. 10, and Yb is the level value of the burst data on the Y axis thereof. That is, $Y = YaX + Yb$, with Y corresponding to the level values An and Bn of the burst data, and X corresponding to the current position of the magnetic head 11. As described later (FIG. 11), the width of each cylinder corresponds to 1.

In step A5, the current position of the magnetic head 11 is computed, on the basis of the integral value Xna obtained in step A1 and the decimal value Xnb computed in step A3 or A4, according to the following equation:

$$Xn = Xna + Xnb \quad \ldots (4)$$

In step A6, the moving speed value V of the magnetic head 11 is computed according to the following equation:

$$V = (Xn - Xn-1)/t \quad \ldots (5)$$

where t is the sector time, n is the sampling number used to obtain position information, and $Xn-1$ is the sampling position immediately preceding the current position Xn of the magnetic head 11. That is, the moving speed value V of the magnetic head 11 is obtained by dividing the moving distance obtained from the current position Xn and the immediately preceding position $Xn-1$, by the sector time t corresponding to a moving time.

The processing from step A1 to step A6, i.e., the processing for obtaining the current position Xn and moving speed value V of the magnetic head 11 on the basis of the address code data Cn and the level values An and Bn of the burst data A and B, will be described in detail below.

Referring to FIG. 8, when the magnetic head 11 is located at cylinder number 13, address code data C13 obtained by the address code data detecting circuit 14 is input to the CPU 17. If the sampling number n is 11, an integral value X11a of a current position X11 of the magnetic head 11 is 13 (step A1).

Figure 11:
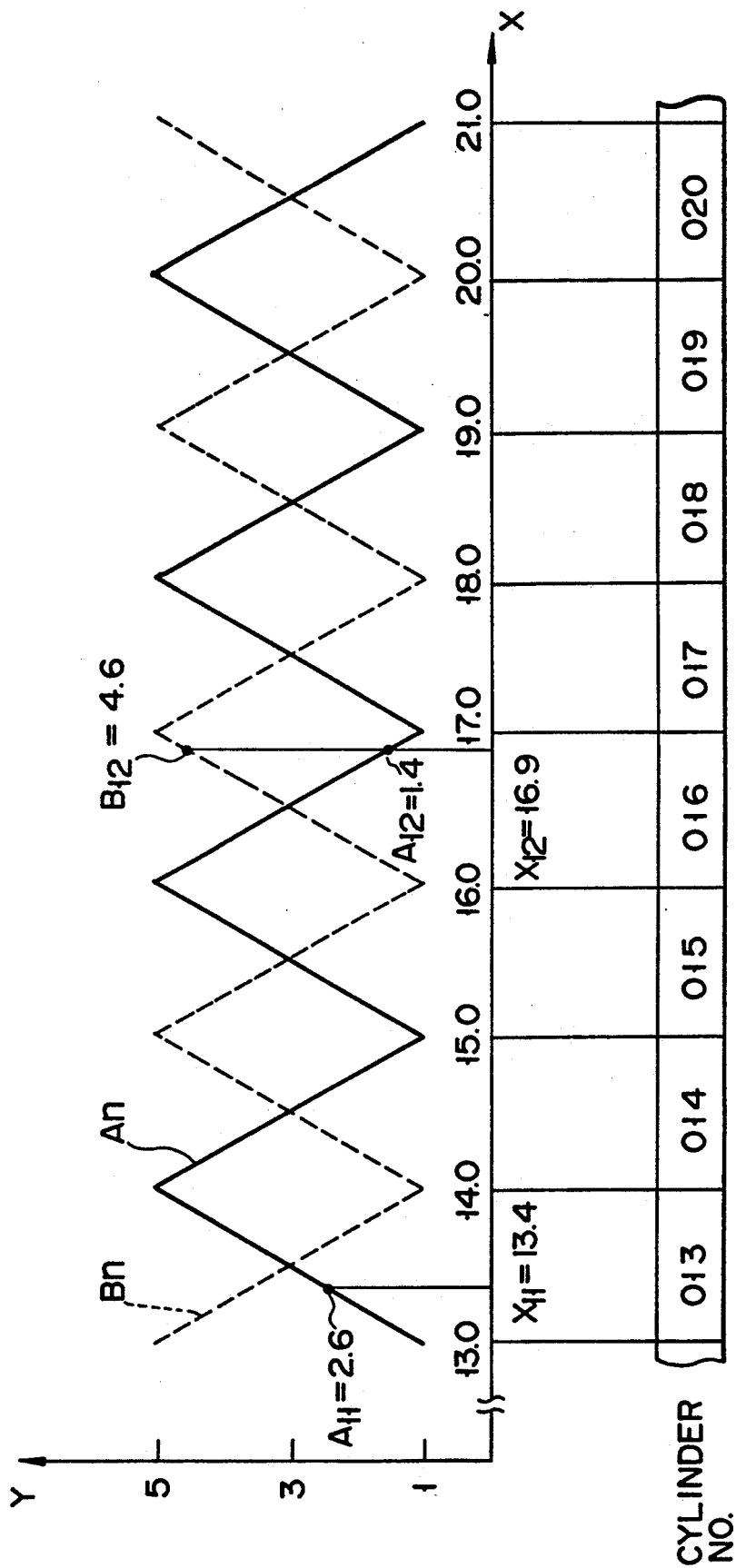
FIG. 11 is a graph showing a relationship between the current position of the magnetic head and the level value of burst data.

Meanwhile, signals representing the level values A11 and B11 of the burst data A and B obtained by the burst data detecting circuit 15 are also input to the CPU 17. Assume, as shown in FIG. 11, that at cylinder number 13, the level value A11 is 2.6, the inclination Ya of the level value A11 is 4, and the value Yb of the level value A11 at X=13.0, is 1. That is, in FIG. 10, the width of the cylinder is 1, X corresponds to the position of the magnetic head 11 on the cylinder (cylinder number 13), and Y is the level value An of the burst data. Therefore, when X=13.5, the magnetic head 11 is positioned on the center of the cylinder. In this case, since the integral value X11a is an odd number (step A2), the decimal value X11b of the current position X11 is computed as follows according to equation (2) (step A3):

$$X11b = (A11 - Yb)/Ya$$
$$= (2.6 - 1)/4 = 0.4$$

Therefore, the current position X11 of the magnetic head 11 at the time when the magnetic head 11 reads out the burst data from the cylinder represented by cylinder number 13 is computed from equation (4) as follows (step A5):

$$X11 = X11a + X11b$$
$$= 13 + 0.4 = 13.4$$

When the magnetic head 11 is moved from the cylinder of cylinder number 13 to the cylinder of cylinder number 16 as shown in FIG. 8, address code data C16 obtained by the address code data detecting circuit 14 is input to the CPU 17. If the sampling number n is 12, an integral value X12a of a current position X12 of the magnetic head 11 is 16 (step A1).

Meanwhile, level values A12 and B12 of the burst data A and B obtained by the burst data detecting circuit 15 are also input to the CPU 17. Assume, as shown in FIG. 11, that at cylinder number 16, the level value B12 is 4.6, the inclination Ya of the level value B12 is 4, and the value Yb of the level value B12 at X=16.0, is 1. That is, in FIG. 10, the width of the cylinder is 1, X corresponds to the position of the magnetic head 11 on the cylinder (cylinder number 16), and Y is the level value Bn of the burst data. In this case, since the integral value X12a is an even number (step A2), the decimal value X12b of the current position X12 of the magnetic head 11 is computed from equation (3) as follows (step A4):

$$X12b = (B12 - Yb)/Ya$$
$$= (4.6 - 1)/4 = 0.9$$

Therefore, the current position X12 of the magnetic head 11 at the time when the magnetic head 11 reads out the burst data from the cylinder represented by cylinder number 16 is computed from equation (4) as follows (step A5):

$$X12 = X12a + X12b$$
$$= 16 + 0.9 = 16.9$$

In this case, if the sector time t is 1, the moving speed value V of the magnetic head 11 is computed from equation (5) as follows (step A6):

$$V = (X12 - X11)/t$$
$$= (16.9 - 13.4)/1 = 3.5 \text{ [cylinder/sector time]}$$

In the above described manner, the current position Xn of the magnetic head 11 can be accurately obtained as a real number on the basis of the address code data Cn and the level values An and Bn of the burst data A and B. Therefore, the remaining distance XE between the current position Xn and the target position XR, and the target speed value VR corresponding to the remaining distance XE can be accurately obtained. With this processing, as shown in FIG. 12, since a variation in the difference between the target speed value VR and the moving speed value V is reduced, the seek time can be shortened. That is, the magnetic head can be accurately moved to a target position at high speed.

Note that if the address code data Cn is constituted by Gray code data or the like, it can prevent the integral value Xna of the current position Xn upon Gray code conversion from indicating a cylinder number other than an adjacent cylinder number. In the above described case, if the sampling number n=12, the integral value X12a of the current position X12 of the magnetic head 11 is 16. However, a case wherein the integral value X12a is 17 will be considered (see FIG. 11). That is, in this case, the magnetic head 11 which is actually located on the cylinder represented by cylinder number 16 is erroneously assumed to be located on the cylinder represented by cylinder number 17 by a read error of address code data Cn.

If the level value A12 at cylinder number 16 is 1.4, the inclination Ya of the level value A12 at cylinder number 17 is 4, and the value Yb of the level value A12 at X=17.0, is 1, since the integral value X12a is an odd number, the decimal value X12b of the current position X12 of the magnetic head 11 is computed from equation (3) as follows:

$$X12b = (A12 - Yb)/Ya$$
$$= (1.4 - 1)/4 = 0.1$$

Therefore, the current position X12 of the magnetic head 11 is computed from equation (4) as follows:

$$X12 = X12a + X12b$$
$$= 17 + 0.1 = 17.1$$

As a result, the difference between the above mentioned current position X12 (=16.9) of the magnetic head 11 and the current position X12 obtained in this case corresponds to 0.2 cylinder.

In general, there is an area between adjacent cylinders, in which the integral value Xna does not clearly indicate the cylinder number of a specific cylinder. In this embodiment, even if a specific cylinder number is indicated in such an indefinite area, the difference is not increased.

Figure 13:
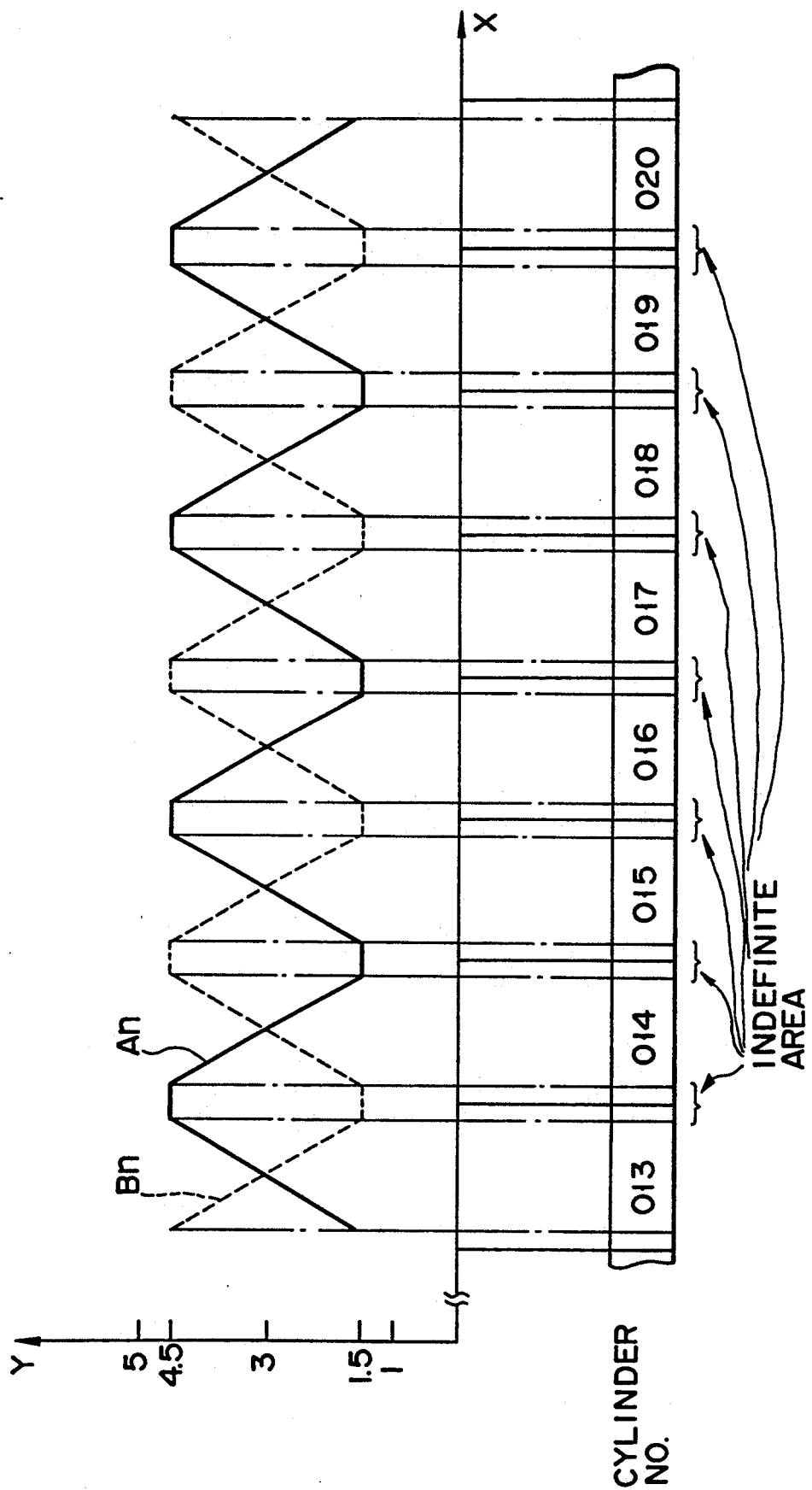
FIG. 13 is a graph showing a relationship between the current position of the magnetic head and changes in the level value of burst data in a case wherein indefinite areas are present between cylinders.

That is, as shown in FIG. 13, if the level values An and Bn of burst data are within a predetermined range, e.g., the range of 4.5 or more and 1.5 or less, i.e., an indefinite area, the decimal value Xnb is set to be 0.0. In the above case, since the level value A12 is 1.4, i.e., in an indefinite area, the current position X12 of the magnetic head 11 is computed from equation (4) as follows:

$$X12 = X12a + X12b$$
$$= 17 + 0.0 = 17.0$$

Therefore, the difference between the above mentioned current position X12 (=16.9) of the magnetic head 11 and the current position computed in this manner is 0.1 cylinder. That is, the difference can be reduced.

In step A7, it is checked whether the moving speed value V of the magnetic head 11 is larger than a reference speed value Vz. This reference speed value Vz is a speed value for determining whether to switch positioning control from speed control to position control. If V>Vz in step A7, the remaining distance XE between the current position Xn and the target position XR of the magnetic head 11 is computed according to the following equation (step A8):

$$XE = XR - Xn \quad \ldots (6)$$

If it is determined in step A7 that V≦Vz, positioning control is switched from speed control to position control, and a control signal In is produced in accordance with a predetermined position control routine (step A9).

In step A10, it is checked whether the current position Xn is larger than a maximum speed limit position XL shown in FIG. 14. Note that the maximum speed limit position XL is an end position in an interval during which the maximum speed value Vmax is maintained in speed control for the magnetic head 11. If it is determined in step A10 that Xn<XL, the target speed value VR is set to be the maximum speed value Vmax (step A11).

If it is determined in step A10 that Xn≧XL, an integral value XE1 corresponding to the integral part of the remaining distance XE and a decimal value XE2 corresponding to the decimal part thereof are obtained from the remaining distance XE (step A12). In this case, the remaining distance XE can be represented by the following equation:

$$XE = XE1 + XE2 \quad \ldots (7)$$

In step A13, a value obtained by adding a predetermined value to the integral value XE1 of the remaining distance XE, i.e., a target speed value V1 corresponding to XE1+1, is read out from the speed table, shown in FIG. 4, which is stored in the ROM 16. In step A14, a target speed value V2 corresponding to the integral value XE1 of the remaining distance XE is read out.

In step A15, an intermediate speed value between the target speed values V1 and V2 is computed as the target speed value VR, on the basis of the read out target speed values V1 and V2 and the decimal value XE2 of the remaining distance XE, according to the following equation:

$$VR = (V1 - V2)XE2 + V2 \quad \ldots (8)$$

The processing from step A8 to step A15, except for step A11, i.e., the processing for obtaining the remaining distance XE between the current position Xn and the target position XR of the magnetic head 11 and the target speed value VR thereof, will be described in detail below.

If, as shown in FIG. 14, the current position Xn of the magnetic head 11 is 329.9 and the target position XR is 350.5, a target speed value VR (thereinafter VR0) computed from equation (1) is $$VR0 = \sqrt{S(XR - Xn)}$$
$$= \sqrt{0.4 \times (350.5 - 329.9)} \approx 2.871$$

Note that the coefficient S is 0.4. As described above, however, since such a square root calculation takes much time in a one-chip CPU, the following speed in speed control is reduced by this calculation. In this embodiment, therefore, the target speed value VR is obtained by approximation based on equation (8).

The remaining distance XE between the current position Xn and the target position XR of the magnetic head 11 is computed from equation (6) as follows (step A8):

$$XE = XR - Xn$$
$$= 350.5 - 329.9 = 20.6$$

In this case, if the maximum speed limit position XL is 100, since Xn≧XL (step A10), the integral value XE1 corresponding to the integral part of the remaining distance XE and the decimal value XE2 corresponding to the decimal part thereof are obtained from the remaining distance XE as follows (step A12):

$$XE1 = 20$$

$$XE2 = 0.6$$

In this case, the target speed values VR corresponding to remaining distances XE21 and XE20 are read out, as the target speed values V1 and V2 from the speed table (see FIG. 4) stored in the ROM 16, on the basis of the integral value XE1 (=20) as follows (steps A13 and A14):

$$V1 = 2.90$$

$$V2 = 2.83$$

An intermediate speed value between the target speed values V1 and V2 is computed as the target speed value VR, on the basis of the read out target speed values V1 and V2 and the decimal value XE2 of the remaining distance XE, according to equation (8) as follows (step A15):

$$VR = (V1 - V2)XE2 + V2$$
$$= (2.90 - 2.83) \times 0.6 + 2.83 = 2.872$$

A difference E between the target speed value VR obtained in this manner and the target speed value VR0 computed from equation (1) is $$E = VR - VR0$$
$$= 2.872 - 2.871 = 0.001$$

It is apparent from the above description that the accurate target speed value VR can be obtained by performing approximation in accordance with the remaining distance XE in the above described manner without increasing the number of data in the speed table. Therefore, the magnetic head can be accurately moved to a target position at high speed.

Note that the number of data in the speed table shown in FIG. 3 is four times that in the speed table shown in FIG. 4. In a magnetic disk apparatus having the speed table shown in FIG. 3, if, for example, the remaining distance XE is 20.6, "2.86" is used as the target speed value VR in correspondence with the remaining distance XE "20.50". Therefore, the difference E between the target speed value VR obtained in this manner and the target speed value VR0 computed from equation (1) is given by $$E = VR - VR0$$
$$= 2.86 - 2.871 = -0.011$$

That is, the difference is increased as compared with the target speed value obtained in the embodiment.

After the processing in step A11 or step A15 is completed, the control signal In $(=K(VR-V))$ corresponding to a value obtained by multiplying the difference between the target speed value VR and the moving speed value V by a gain K is produced in step A16. Note that if the magnetic head 11 is moved at a constant speed, i.e., the maximum speed limit position XL is larger than the current position Xn, the maximum speed value Vmax is used as the target speed value VR. In addition, if the magnetic head 11 is decelerated, i.e., $Xn \geq XL$, the target speed value VR computed from equation (15) is used as the target speed value VR.

After the processing in step A9 or step A16 is completed, the produced control signal In is input to the VCM driver 19 in step A17.

In response to this control signal In, the VCM driver 19 drives the VCM 18. With this operation, the magnetic head 11 is moved over the disk 10 by the carriage 23.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic reproducing and recording apparatus having a servo system which controls the speed of a head according to servo data, comprising:
   a recording medium on which the servo data including address code data and burst data is recorded, the address code data representing a cylinder number and the burst data being used in position control for positioning the head at a center of a target cylinder;
   means for detecting the address code data from a signal reproduced by the head;
   means for detecting a level value of the burst data from the signal reproduced by the head;
   first means for generating an integer value representing a current position of the head in accordance with the detected address code data when the head is moved to the target cylinder using speed control;
   second means for generating a decimal fraction value representing the current position of the head in accordance with the level value of the detected burst data when the head is moved to the target cylinder using speed control;
   means for computing a remaining distance of movement of the head from the current position to the target cylinder, on the basis of the current position determined by the integer value and the decimal fraction value; and
   means for generating a target speed value corresponding to the computer remaining distance, the target speed value being used to control the speed of the head.

2. An apparatus according to claim 1, wherein the recording medium has a plurality of cylinders, each cylinder has a plurality of sectors, and the servo information is recorded on each sector.

3. An apparatus according to claim 1, wherein said second means computes the decimal fraction value "Xn" according to an equation "$Xn=(An-Yb)/Ya$" in which "An" is a level value of the detected burst data according to the current position of the head, "Yb" is a minimum level value of the detected burst data, and "Ya" is an inclination of a linear line of the level value "An".

4. A magnetic reproducing and recording apparatus having a servo system which controls the speed of a head according to servo data, comprising:
   a recording medium on which the servo data including address code data and burst data is recorded, the address code data representing a cylinder number and the burst data being used in position control for positioning the head at a center of a target cylinder;
   means for detecting the address code data from a signal reproduced by the head;
   means for detecting a level value of the burst data from the signal reproduced by the head;
   storage means for storing a remaining distance between a current position and a target position of the head and a target speed value corresponding to the remaining distance;
   first means for generating an integer value representing a current position of the head in accordance with the detected address code data when the head is moved to the target position using speed control;
   second means for generating a decimal fraction value representing the current position of the head in accordance with the level value of the detected burst data when the head is moved to the target position using speed control;
   means for computing a remaining distance of movement of the head from the current position to the target position, on the basis of the current position determined by the integer value and the decimal fraction value of the current position; and
   third means for reading out a first and a second target speed values from the storage means on the basis of the computed remaining distance, and generating an intermediate speed value which is computed on the basis of the first and second target speed values and a decimal fraction value of the remaining distance, as the target speed value corresponding to the computed remaining distance.

5. An apparatus according to claim 4, wherein said second means computes the decimal fraction value "Xn" according to an equation "$Xn=(An-Yb)/Ya$" in which "An" is a level value of the detected burst data according to the current position of the head, "Yb" is a minimum level value of the detected burst data, and "Ya" is an inclination of a linear line of the level value "An".

6. An apparatus according to claim 4, wherein said third means computes the intermediate speed value "Vr" according to an equation "Vr=(V1−V2)XE+V2" in which "V1" is a first target speed value, "V2" is a second target speed value, and "XE" is a decimal fraction value.

7. An apparatus according to claim 4, wherein the intermediate speed value is computed on the basis of the first target speed value determined by the sum of an integer value of the computed remaining distance and a predetermined integer value, the second target speed value determined by the integer value of the computed remaining distance, and the decimal fraction value of the computed remaining distance.

8. An apparatus according to claim 4, wherein the remaining distance stored in the storage means is given as an integral value.

9. A method of controlling a speed of a head with servo data, in a magnetic reproducing and recording apparatus which has a servo system and a recording medium, the servo data being recorded on the recording medium and including address code data and burst data, the address code data representing a cylinder number, and the burst data being used in position control for positioning the head at a center of a target cylinder, the method comprising the steps of:

detecting the address code data from a signal reproduced by the head;

detecting a level value of the burst data from the signal reproduced by the head;

generating an integer value representing a current position of the head in accordance with the detected address code data when the head is moved to the target cylinder using speed control;

generating a decimal fraction value representing the current position of the head in accordance with the level value of the detected burst data when the head is moved to the target cylinder using speed control;

computing a remaining distance of movement of the head from the current position to the target cylinder, on the basis of the current position determined by the integer value and the decimal fraction value of the current position; and generating a target speed value corresponding to the computed remaining distance, the target speed value being used for the speed control.

10. A method of controlling a speed of a head with servo data, in a magnetic reproducing and recording apparatus which has a servo system and a recording medium, the servo data being recorded on the recording medium and including address code data and burst data, the address code data representing a cylinder number, and the burst data being used in position control for positioning the head at a center of a target cylinder, the method comprising the steps of:

detecting the address code data from a signal reproduced by the head;

detecting a level value of the burst data from the signal reproduced by the head;

storing into storage means a remaining distance between a current position and a target position of the head, and a target speed value corresponding to the remaining distance;

generating an integer value representing a current position of the head in accordance with the detected address code data when the head is moved to the target position using speed control;

generating a decimal fraction value representing the current position of the head in accordance with the level value of the detected burst data when the head is moved to the target position using speed control;

computing a remaining distance of movement of the head from the current position to the target cylinder, on the basis of the current position determined by the integer value and the decimal fraction value of the current position;

reading out first and second target speed values from the storage means on the basis of the computed remaining distance; and generating an intermediate speed value which is computed on the basis of the first and second target speed values and a decimal fraction value of the current position, as the target speed value corresponding to the computed remaining distance.

* * * * *

UNITED STATES PATENT AND TRADEMARK OFFICE
CERTIFICATE OF CORRECTION

PATENT NO. : 5,285,330
DATED : February 08, 1994
INVENTOR(S) : Hideo Masaki

It is certified that error appears in the above-indentified patent and that said Letters Patent is hereby corrected as shown below:

Claim 1, column 12, line 5, change "computer" to --computed--.

Claim 6, column 13, lines 3 and 4 change "Vr" to --VR--.

Signed and Sealed this

Twentieth Day of December, 1994

Attest:

BRUCE LEHMAN

Attesting Officer     Commissioner of Patents and Trademarks